United States Patent
Pandres, Jr.

[11] 4,156,933
[45] May 29, 1979

[54] RATIO PRESERVING CONTROL SYSTEM

[76] Inventor: Dave Pandres, Jr., 111 Walker Dr., Dahlonega, Ga. 30533

[21] Appl. No.: 820,005

[22] Filed: Jul. 28, 1977

[51] Int. Cl.² ............... G06G 7/66; G02B 7/10
[52] U.S. Cl. .................... 364/109; 350/187; 364/400
[58] Field of Search ............ 364/109, 117, 722, 857, 364/850; 350/184, 186, 187, 75, 206; 352/140, 141; 354/196

[56] References Cited

U.S. PATENT DOCUMENTS

| | | | |
|---|---|---|---|
| 1,950,166 | 3/1934 | Durholz | 350/187 X |
| 2,663,223 | 12/1953 | Hopkins | 350/184 |
| 3,733,476 | 5/1973 | Hopkins et al. | 364/109 X |
| 3,765,748 | 10/1973 | Mito | 350/187 |
| 3,834,648 | 9/1974 | Rose, Jr. et al. | 364/109 X |
| 4,048,964 | 9/1977 | Kissel | 364/109 X |

FOREIGN PATENT DOCUMENTS

| | | | |
|---|---|---|---|
| 1183354 | 12/1960 | Fed. Rep. of Germany | 350/187 |
| 854206 | 12/1972 | Japan | 350/187 |
| 481389 | 9/1968 | Switzerland | 350/187 |
| 899635 | 6/1962 | United Kingdom | 350/187 |

Primary Examiner—Joseph F. Ruggiero
Attorney, Agent, or Firm—B. J. Powell

[57] ABSTRACT

A ratio preserving method and apparatus for a system having a plurality of operating values, each independently changeable over a prescribed quantity range by a change in a separate control input by selectively interconnecting the separate control inputs so that change in one of the interconnected control inputs produces an appropriate change in the other interconnected control inputs to maintain the selected fixed ratio between the interconnected operating values. One such system illustrated is a zoom lens where the ratio between object distance and focal length can be selectively fixed to keep the image size constant while the focus is changed when the distance between the object and the lens changes.

10 Claims, 11 Drawing Figures

RATIO PRESERVING CONTROL SYSTEM

BACKGROUND OF THE INVENTION

Many systems today require different system operating values to be changed where each of these operating values are independently changed by a different control input where the control inputs can be changed independently of each other. The change of one of the system operating values as a function of the change in its control input may be linear or non-linear. Frequently such non-linear function is monotonic. One of the frequently encountered ways of providing the control input to change a system operating value is through a control member which is physically displaced relative to some reference point. The change of any particular operating value in response to a prescribed displacement of its associated control member relative to the reference point associated therewith may be different not only for the different operating values but also may be different at different positions within the quantity range of the operating value controlled by its associated control member where the functional relationship between the operating value and its control member is monotonic. It is frequently desirable to reduce the number of degrees of freedom in the system so as to maintain the ratio between these different operating values constant while each of the different operating values is changed in response to changes in its associated control input. Because the change of the different operating values in response to changes in their associated control inputs may be different, it does not suffice either to directly and rigidly connect the control members directly providing the control inputs or to maintain a fixed ratio between the control inputs to maintain the desired constant ratio between the operating values. By way of an example using physical displacement of independent control members to independently change different system operating values independently of each other, it is desirable on occasion when using a camera zoom lens to both keep the object in focus and keep the image size constant even though the distance between the object being photographed and the camera is changing. Another example is in a paint mixing machine using the three primary color pigments of red, yellow and blue where the desired color has been obtained in a small quantity of paint mixed using a prescribed ratio between the primary color pigments and it is desirable to mix a larger quantity of paint with the same primary color pigment ratio. Presently there is no mechanism to reduce the number of degrees of freedom in the control of a system necessary to achieve the desired result.

SUMMARY OF THE INVENTION

These and other problems and disadvantages associated with the prior art are overcome by the invention disclosed herein by providing a method of and apparatus for selectively maintaining a constant ratio between different system operating values even though these values are independently controlled by different control inputs. This serves to reduce the number of degrees of freedom of such system to make the control thereof more manageable. Basically, the method of the invention includes converting each of the various operating values over its range to corresponding logarithmic values of some constant base, setting the control input of each of the various operating values to some specific quantity in each of the operating value ranges to establish the desired ratios between the operating values which is to be maintained, and then interconnecting the various control inputs through the logarithmic converted values so that the difference between the logarithmic values remains fixed and a change in any one of the various control inputs causes an appropriate change in the other interconnected control inputs to maintain the selected fixed ratio between the operating values. This serves to maintain the desired prescribed ratio or ratios between the operating values even though each may change at a different rate. Where the control inputs are through independent control members which are physically displaced relative to some reference point, these control members are physically or electrically connected in the manner described above so that displacement of one of the control members relative to its reference point produces an appropriate displacement of the other control members relative to their respective reference points so that the difference between the logarithmic converted values of the operating values remains constant thereby maintaining the desired fixed ratio between the various operating values. One embodiment of the method includes changing the object distance value of a zoom lens to keep the object being photographed in focus and while simultaneously changing the focal length value of the zoom lens to maintain a selected prescribed fixed ratio between object distance quantity and focal length quantity in order to keep the image size substantially constant.

The apparatus of the invention is adapted for use with a system having various independently variable operating values, each controlled by a separate control input where the functional relationship between each operating value and its associated control input may be linear or non-linear but is always monotonic. The apparatus includes an interlock means for interconnecting any selected plurality of the various control inputs in such a manner that the ratio between any selected plurality of the operating values can be maintained constant. The interlock means includes a separate sending means operatively associated with each of said operating values to produce a converted output which is the logarithm of the particular operating value quantity as set by the control input. Each time the control input is changed to change the set operating value quantity, the sending means output appropriately changes so that its output is the logarithm of this new set operating value quantity. The interlock means further includes interconnecting means for selectively interconnecting any plurality of the control inputs and the sending units associated with the interconnected control inputs so that the control inputs are controlled by the interconnecting means whereby the difference between the converted logarithmic outputs of the sending means associated with the interconnected control inputs is maintained constant as the control inputs are changed to maintain a fixed ratio between the interconnected system operating values.

One embodiment of the interlock mechanism for use on systems where the operating values of the system is controlled by displacement of separate control members relative to associated reference points includes cam means associated with each of the control members which displaces a cam follower member in response to movement of the control member so that the displacement of the cam follower member is representative of the logarithm to a common base of the control value quantity set by the control member. A locking means is provided for selectively locking the cam follower members together so that movement of one of the control members produces a corresponding movement in one or more of the other control members to maintain a constant difference between the logarithmic values of the locked cam follower members and thus the ratio between the operating values controlled thereby constant. Another embodiment of the interlock mechanism for a similar system includes sending means operatively connected to each of the control members generating a logarithmic output representative of the logarithm of the quantity in the operating value range controlled by the control member, comparator means for comparing the logarithmic outputs, and driving means controlled by the comparator means for moving one or more of the control members to maintain a prescribed difference between the logarithmic outputs of two or more of the sending units and thus the prescribed ratio between the operating values connected thereto.

These and other features and advantages of the invention will become more clearly understood upon consideration of the following description and accompanying drawings wherein like characters of reference designate corresponding parts throughout the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Many systems have their outputs controlled by a plurality of independently variable operating values. Usually, each of these operating values are controlled by a separate control input. Frequently, each control input is provided by a control member which changes the operating value in response to either linear or rotational displacement of the control member with respect to some reference point. A control member with different independent displacements may control more than one operating value independently. Many times, it is desirable to change the various operating values while maintaining some constant ratio between two or more of the various operating values. An example of such a system is illustrated in a zoom lens $L_Z$ seen in FIGS. 1 and 2.

Figure 1:
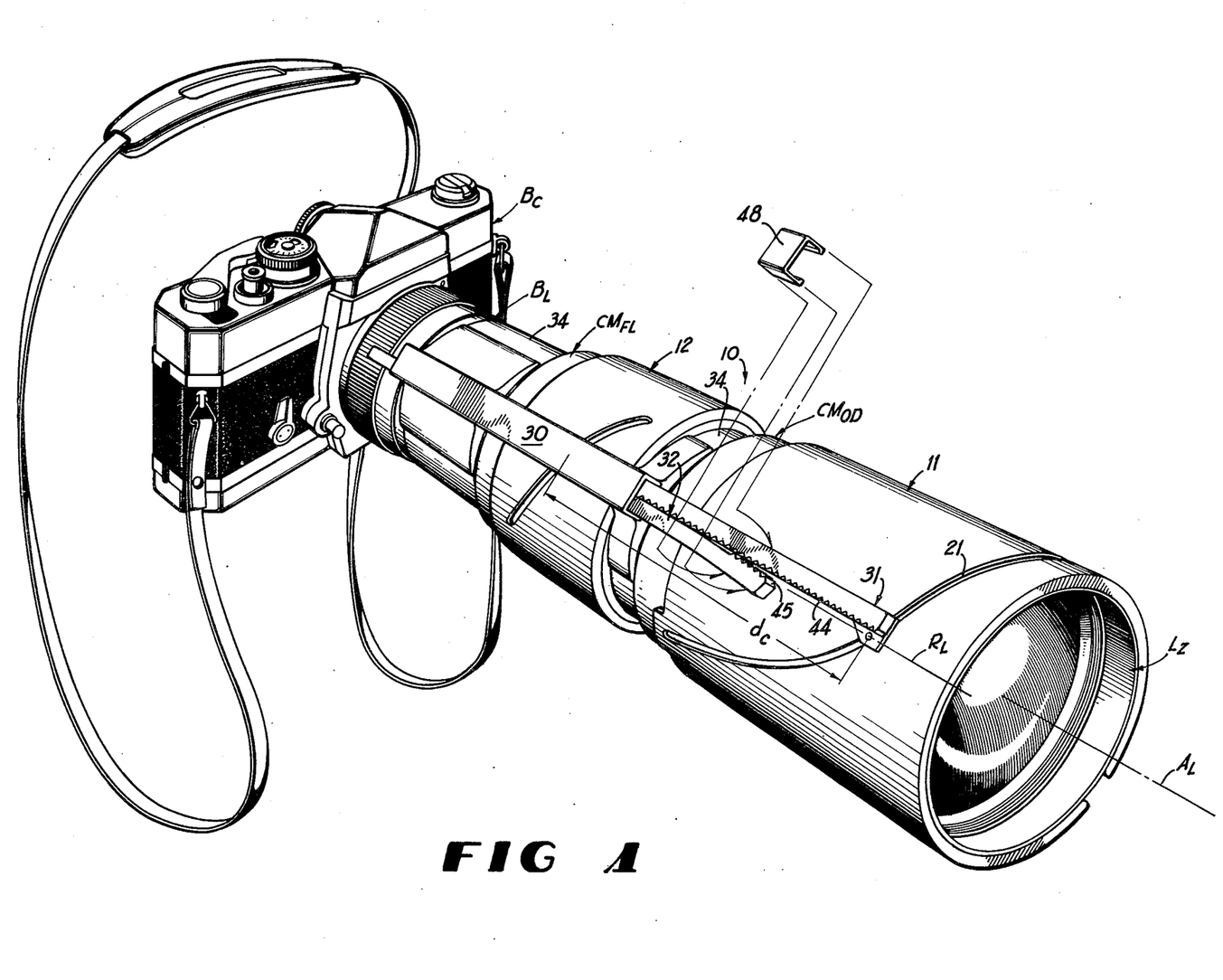
FIG. 1 is a perspective view of one embodiment of the invention.
Figure 2:
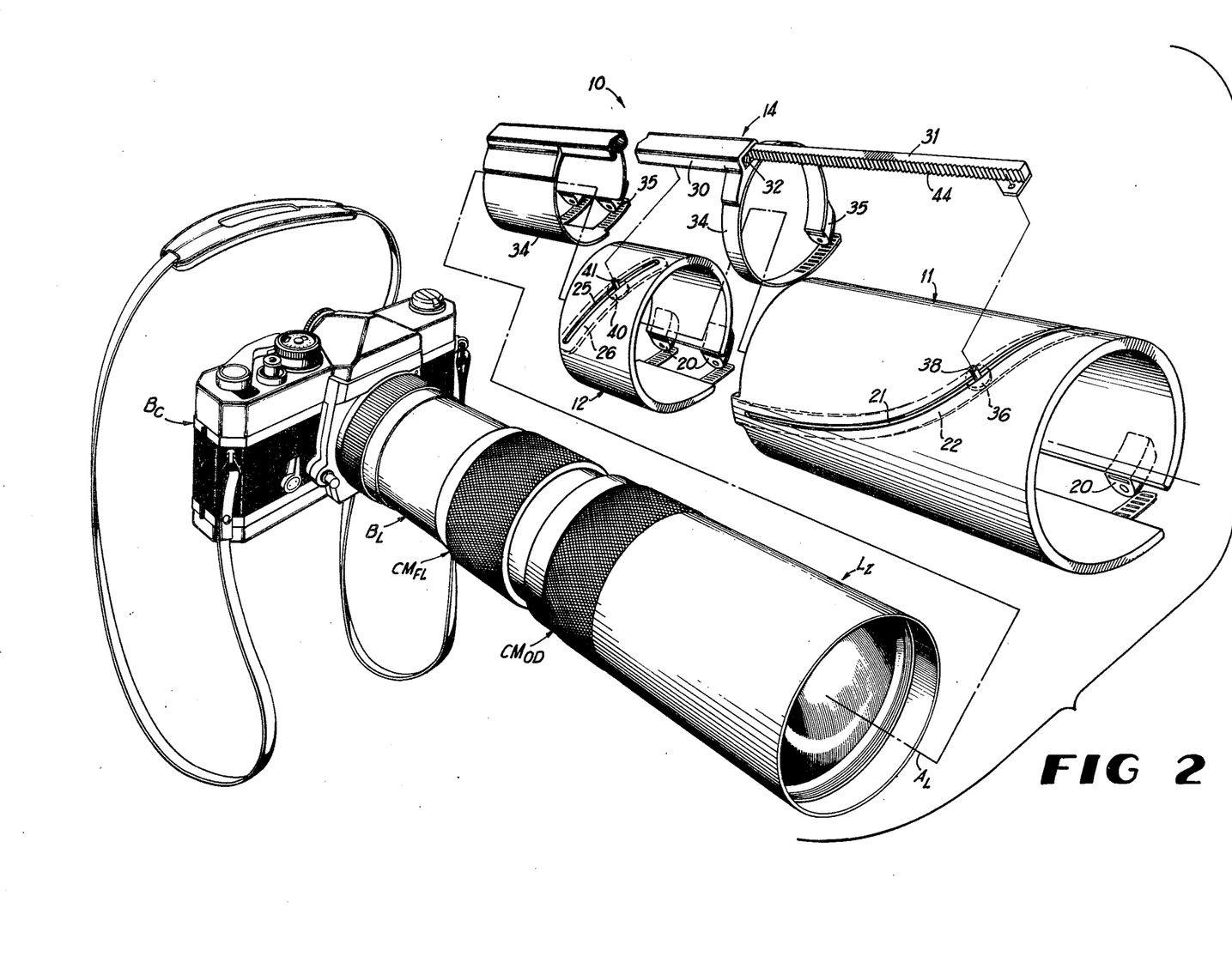
FIG. 2 is an exploded perspective view of that embodiment of the invention seen in FIG. 1.

As seen in FIGS. 1 and 2, the zoom lens $L_Z$ is illustrated mounted on a 35 mm camera body $B_C$ although similar type lens are applied to a wide variety of still, movie, and television cameras. As is conventional, the zoom lens $L_Z$ has two independently variable operating values. One of these values is the object distance (i.e. the distance from the object to the plane of the film where the lens sharply focuses the image) and the other value is the lens focal length (i.e. the degree of magnification of the lens). The particular quantity of the object distance value is manually set by an object distance control member $CM_{OD}$ (FIG. 2) which is rotatably mounted on the lens body $B_L$ about the lens axis $A_L$. As the control member $CM_{OD}$ is rotated with respect to the lens body $B_L$, the lens body $B_L$ being fixed to the camera body $B_C$, the quantity of the object distance value changes at some known rate of change. The particular quantity of the focal length value is manually set independently of the object distance value by a focal length control member $CM_{FL}$ (FIG. 2) which is also rotatably mounted on the lens body $B_L$ about the lens axis $A_L$. As the focal length control member $CM_{FL}$ is rotated with respect to the lens body $B_L$, the quantity of the focal length value changes at some known rate, usually different from that of the object distance. If the object distance remains constant (i.e. the object is a constant distance from the lens $L_Z$, the control members $CM_{OD}$ and $CM_{FL}$ can be easily manipulated to give the desired focused image size on the film in the camera. The operator simply rotates the object distance control member $CM_{OD}$ until the object is in focus. The operator then releases the control member $CM_{OD}$ and independently rotates the focal length control member $CM_{FL}$ until the desired size image is projected onto the film as seen through the viewfinder on the camera.

It is quite a complicated task, however, to manipulate the control members $CM_{OD}$ and $CM_{FL}$ to give both the desired image size on the film in the camera while keeping the image in focus if the distance between the object and the lens $L_Z$ is changing. To accomplish this manually, it is necessary for the operator to manipulate both control members $CM_{OD}$ and $CM_{FL}$ simultaneously and usually at different rates which is extremely difficult and awkward for the operator. Optically, this desired result is achieved by keeping the ratio of the object distance value to the focal length value constant.

The invention is incorporated in an interlock mechanism 10 (FIGS. 1 and 2) which can be used to selectively mechanically interconnect the control members $CM_{OD}$ and $CM_{FL}$ so that a constant ratio is maintained between the object distance value and the focal length value. When the interlock mechamism 10 is engaged as will become more apparent, movement of either control member $CM_{OD}$ or $CM_{FL}$ will produce a corresponding movement in the other control member $CM_{OD}$ or $CM_{FL}$ to keep the desired fixed ratio between the object distance value and the focal length value to reduce the number of degrees of freedom in the control of the lens from two to one.

The interlock mechanism 10 as seen in FIGS. 1 and 2 includes generally an object distance control cam 11 mounted on and movable with the object distance control member $CM_{OD}$, a focal length control cam 12 mounted on and movable with the focal length control member $CM_{FL}$ and an interconnect unit 14 which interconnects the control cams 11 and 12. The cams 11 and 12 may be made as an integral part of its associated control member $CM_{OD}$ or $CM_{FL}$ or may be made separately and attached thereto. By way of illustration, object distance control cam 11 is a split sleeve member which is clamped onto the object distance control member $CM_{OD}$ with appropriate clamping mechanisms 20 so that the control cam 11 rotates with the object distance control member $CM_{OD}$ about the lens axis $A_L$ and is concentric therewith. The object distance control cam 11 defines slot 21 therein which extends circumferentially along the cam 11 for a prescribed subtended angle $A_1$ (FIG. 4) as will become more apparent. The slot 21 also extends from a base axial reference plane $AP_{OD}$ normal to the lens axis $A_L$ an effective distance $d_1$ (FIG. 3) axially along the cam 11 as will become more apparent.

Figure 5:
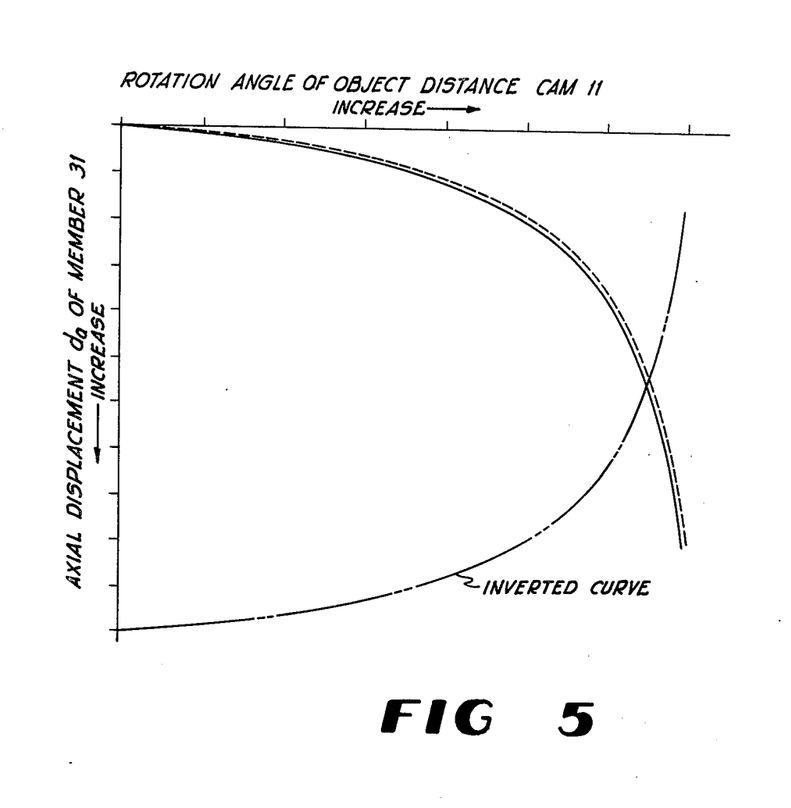
FIG. 5 is a curve illustrating the shape of the object distance control cam of that embodiment of FIG. 1.

The shape of slot 21 is determined by the particular object distance quantities in the object distance value range and is set by the logarithmic values of the object distance quantities versus the control member $CM_{OD}$ displacement relative to its reference point. While the actual object distance quantities may be used in the following calculations, dividing the actual object distance quantity by the smallest object distance quantity in the object distance quantity range facilitates such calculations, and this technique is used below. This technique is not meant to be limiting, however. The particular distance $d_a$ that the slot 21 is displaced axially along the cam 11 is determined by the equation:

$$d_a = K \log_x \frac{\text{actual object distance quantity}}{\text{smallest object distance quantity}}$$

where the actual object distance quantity is that of any particular setting of the object distance control member $CM_{OD}$, where x is any convenient base for the logarithm, and where K is a constant. Thus, for each actual object distance quantity in the object distance value range to which the lens $L_Z$ can be set, there is a corresponding point on the slot 21 which is displaced axially from the axial base reference plane $AP_{OD}$ the distance $d_a$ determined by the above equation. FIG. 5 is a curve showing the shape of the slot 21 in the cam 11 as axial displacement of the slot 21 from the axial base reference plane $AP_{OD}$ versus rotational displacement of the cam 11 and control member $CM_{OD}$ from the radial base reference plane $RP_{OD}$ (FIG. 4) for a particular lens $L_Z$. It is to be understood that the slot 21 may have different shapes for different lenses. The particular curve seen in FIG. 5 further does not account for any axial movement of the control member $CM_{OD}$ with respect to the lens body $B_L$ which is usually present with object distance control members. The dashed curve in FIG. 5 shows the shape of slot 21 when compensation is made for the axial movement of the control member $CM_{OD}$ and thus cam 11.

Further by way of illustration, the focal length control cam 12 is also a split sleeve member which is clamped onto the focal length control member $CM_{FL}$ with the appropriate clamping mechanisms 20 so that the control cam 12 rotates with the focal length control member $CM_{FL}$ about lens axis $A_L$ and is concentric therewith. The focal length control cam 12 defines a curvilinear slot 25 therethrough which extends circumferentially along the cam 12 for a prescribed subtended angle $A_2$ (FIG. 4) as will become more apparent. The slot 25 also extends from a base axial reference plane $AP_{FL}$ normal to the lens axis $A_L$ an effective distance $d_2$ (FIG. 3) axially along the cam 12 as will become more apparent.

Figures 3, 4:
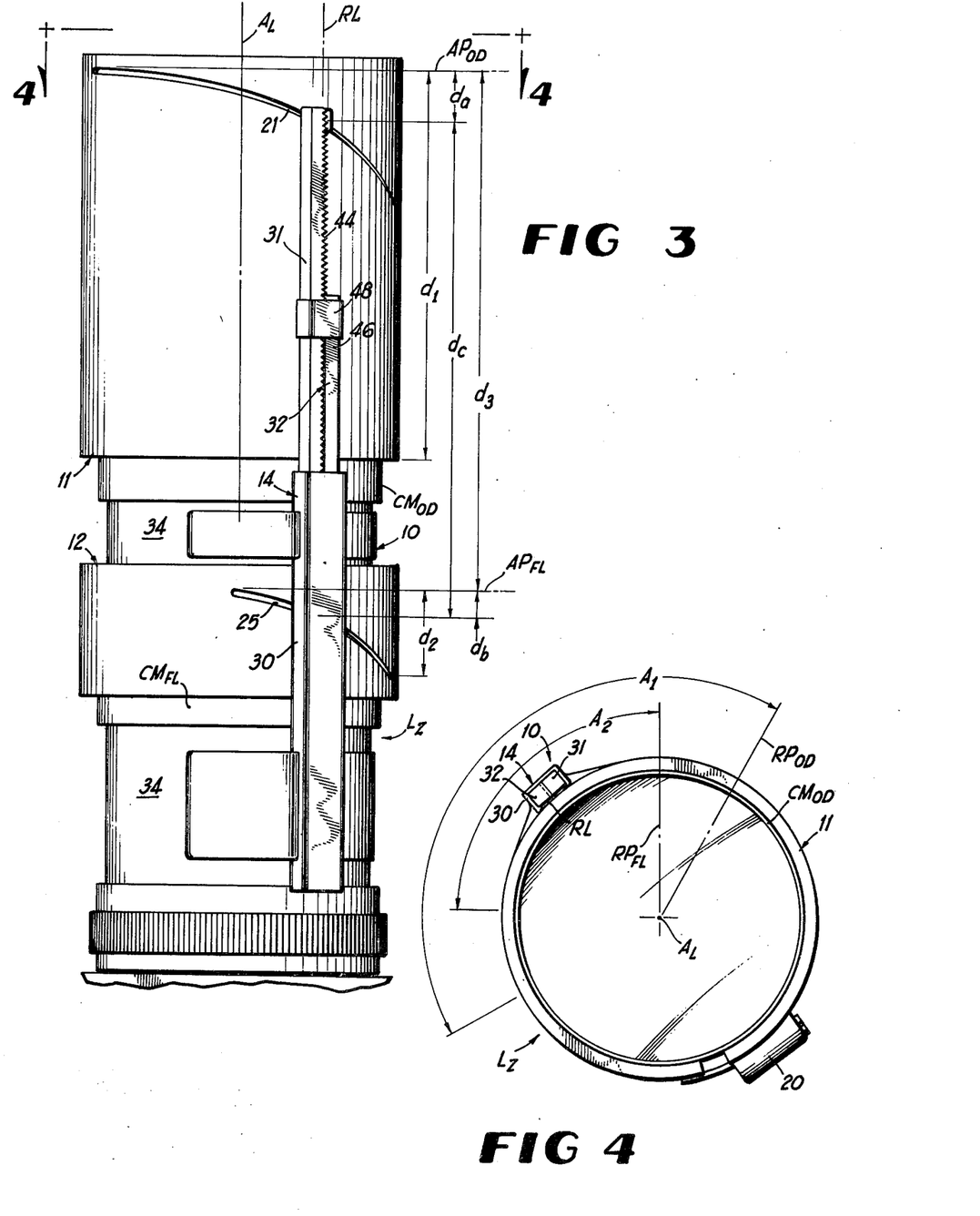
FIG. 3 is a plan view of the lens of that embodiment of the invention seen in FIG. 1.
FIG. 4 is a projecting end view taken along line 4—4 in FIG. 3.
Figure 6:
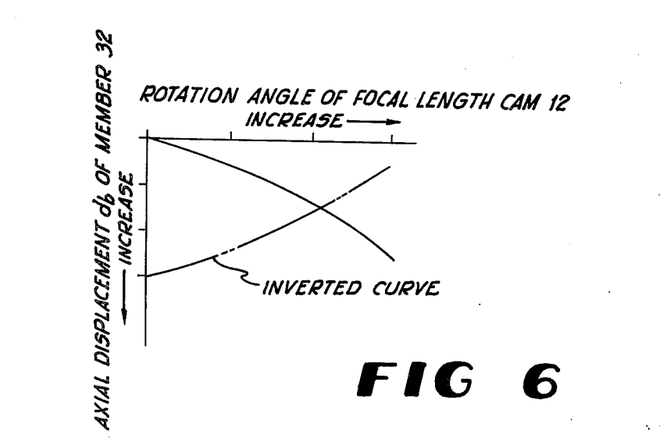
FIG. 6 is a curve illustrating the shape of the focal length control cam of that embodiment of FIG. 1.

The shape of slot 25 is determined by the particular focal length quantities in the focal length value range and is set by the logarithmic values of the focal length quantities versus the control member $CM_{FL}$ displacement relative to its reference point. While the actual focal length quantities may be used in the following calculations, dividing the actual focal length quantity by the smallest focal length quantity in the focal length quantity range facilitates such calculations, and this technique is used below. As in the case of object distance, this technique is not meant to be limiting. The particular distance $d_b$ that slot 25 is displaced axially along cam 12 is determined by the equation:

$$d_b = K \log_x \frac{\text{actual focal length quantity}}{\text{smallest focal length quantity}}$$

where the actual focal length quantity is that of any particular setting of the focal length control member $CM_{FL}$, where x is the same base used in obtaining slot 21, and where K is the same constant used in obtaining slot 21. Thus, for each actual focal length quantity in the focal length value range to which the lens $L_Z$ can be set, there is a corresponding point on the slot 25 which is displaced axially from the axial base reference plane $AP_{FL}$ the distance $d_b$ determined by the above equation. FIG. 6 is a curve showing the shape of slot 25 in cam 12 as axial displacement of the slot 25 from the axial base reference plane $AP_{FL}$ versus rotational displacement of the cam 12 and control member $CM_{FL}$ from the radial base reference plane $RP_{FL}$ (FIG. 4) for the particular lens $L_Z$. The slot 25, of course, may have different shapes for different lenses. While the curve of FIG. 6 does not account for axial displacement of the control member $CM_{FL}$ with respect to the lens body $B_L$, it can easily be modified to do so if necessary. Usually, however, the control member $CM_{FL}$ is not displaced axially during adjustment.

It will be appreciated that zero and infinity are excluded from the range of the operational values since these quantities have an infinite logarithmic value. Also, the value range should be of the same sign, either positive or negative or be converted to have the same sign in order to properly define the shape of slots 21 and 25.

It will further be seen that the axial base reference planes $AP_{OD}$ and $AP_{FL}$ are effectively axially fixed with respect to each other and to the lens body $B_L$ (the reference plane $AP_{OD}$ actually moves axially but this movement is compensated by the actual shape of slot 21). Thus, if one selects a prescribed reference line RL (FIG. 1) parallel to the lens axis $A_L$ and rotationally fixed with respect to the lens body $B_L$, it will be seen that the slots 21 and 25 can be made to intersect this reference line RL while the control cams 11 and 12 are rotated over the particular value range associated therewith. The initial rotational placement of the control cams 11 and 12 on their respective control members $CM_{OD}$ and $CM_{FL}$ are selected so that the slots 21 and 25 intersect the reference line RL over the range of movement of the respective control members $CM_{OD}$ and $CM_{FL}$ on which they are carried. It will also be appreciated that the reference line for each cam 11 and 12 may be located at different positions. Only one reference line FL is used for simplicity. Although not intended as limiting, the initial rotational placement of the object distance control cam 11 with respect to the object distance control member $CM_{OD}$ at the time it is clamped on member $CM_{OD}$ is illustrated with the radial reference plane $RP_{OD}$ passing through the reference line RL when the lens $L_Z$ is set at its smallest object distance quantity. Further, while not intended as limiting, the initial rotational placement of the focal length control cam 12 with respect to the focal length control member $CM_{FL}$ is selected so that the radial reference plane $RP_{FL}$ passes through the reference line RL when the lens $L_Z$ is set at its smallest focal length quantity. Although not necessary, the slots 21 and 25 in the respective cams 11 and 12 are oriented so that each is displaced from its associated axial reference plane $AP_{OD}$ or $AP_{FL}$ in the same sense as the associated control member $CM_{OD}$ or $CM_{FL}$. It will be appreciated from FIG. 3 that both slots 21 and 25 are displaced further away from their respective axial reference plane $AP_{OD}$ and $AP_{FL}$ as the respective control members $CM_{OD}$ and $CM_{FL}$ along with cams 11 and 12 are rotated clockwise as viewed from the projecting end of lens $L_Z$ as seen in FIG. 4. On the other hand, the mechanism 10 would work just as well if the shape of both slots 21 and 25 were reversed or if they are turned over as shown by the phantom line curves in FIGS. 5 and 6 and labelled "inverted curve".

The interconnect unit 14 includes a housing 30 (FIGS. 1-4) which slidably mounts therein a pair of cam follower members 31 and 32. The housing 30 is fixedly mounted on the lens body $B_L$. Although not necessary, the housing 30 is located parallel to and positioned over the axially extending reference line RL to simplify explanation while the housing 30 may be integral with lens body $B_L$, it is illustrated as clamped onto the lens body $B_L$ through a pair of clamping bands 34 and appropriate clamping mechanisms 35 best seen in FIG. 2. The cam follower members 31 and 32 are slidably mounted in housing 30 so that they are independently axially movable in housing 30 for simplicity and convenience along parallel paths. Further for convenience, the cam follower members 31 and 32 are arranged so that the path of movement of one of them coincides with the reference line RL and is illustrated in the drawings as member 32. The cam follower member 31 is connected to slot 21 in the object distance control cam 11 through a cam follower roller 36 (FIG. 2) whose mounting shaft 38 projects through slot 21 so that roller 36 rides in a roller channel 22 in cam 11 behind slot 21. The cam follower roller 36 is connected to the cam follower member 31 so that the mounting shaft 38 moves along the reference line RL as the cam follower member 31 is reciprocated in housing 30. The cam follower member 32 is connected to the slot 25 in the focal length control cam 12 through a cam follower roller 40 (FIG. 2) whose mounting shaft 41 projects through slot 25 so that roller 40 rides in a roller channel 26 in cam 12 behind slot 25. The roller 40 is connected to the cam follower member 32 so that its mounting shaft 41 also moves along the reference line RL as the cam follower member 32 is reciprocated in housing 30. Thus it will be seen that the slot 21 and its associated rolled channel 22 in the object distance control cam 11 axially displaces the object distance cam follower member 31 in response to rotation of cam 11 and vice versa. Likewise, slot 25 and its associated roller channel 26 in the focal length control cam 12 axially displaces the focal length cam follower member 32 in response to rotation of cam 12 and vice versa.

Means is provided for selectively locking the cam follower members 31 and 32 together at any selected position so that the members 31 and 32 move as a unit. While any variety of means may be used, such means are shown herein for purposes of illustration as a plurality of interlocking teeth 44 on that side of the cam follower member 31 in juxtaposition with the cam follower member 32 as seen in FIGS. 1 and 2. Further by way of illustration in FIG. 1, the projecting end 46 of the cam follower member 32 is provided with a few teeth 45 which will mesh with the teeth 44 on the cam follower member 31 as will become more apparent. A number of different techniques may be used to selectively maintain the teeth 44 and 45 in mesh so that members 31 and 32 move as a unit or out of mesh so that members 31 and 32 move independently. While not intended to be limiting, one way of maintaining the teeth 44 and 45 out of mesh is to make the projecting end 46 of the cam follower member 32 sufficiently resilient for the teeth 45 thereon to be displaced out of mesh with the teeth 44 on the cam follower member 31 as seen in FIG. 1 when the projecting end 46 of cam follower member 32 is not forced toward the cam follower member 31. Any number of forcing means can be used to selectively positively force the projecting end 46 of cam follower member 32 toward cam follower member 31 to mesh teeth 44 and 45. While not intended to be limiting, the teeth 45 on member 32 can be forced into positive mesh with the teeth 44 on member 31 by a selectively removable clip 48 illustrated in FIG. 1. When the clip 48 is in position clamping the teeth 44 and 45 together, the cam follower members 31 and 32 are locked together so that they move as a single unit. This serves to fix the distance $d_c$ between the cam follower rollers 36 and 40 as seen in FIG. 1. Because the distance $d_c$ between the rollers 36 and 40 is now fixed, movement of the object distance control member $CM_{OD}$ and its object distance control cam 11 will cause the cam follower member 31 and 32 to appropriately move the focal length control member $CM_{FL}$ and its focal length control cam 32. Conversely, when clip 48 is removed, the teeth 44 and 45 unmesh so that members 31 and 32 are again independently movable.

As long as distance $d_c$ remains constant, the ratio between object distance and focal length remains constant because the displacement of members 31 and 32 is logarithmic of the respective actual object distance quantities and focal length quantities as will become more apparent. It will also be appreciated that the teeth 44 and 45 can be meshed at any point along the length of the cam follower member 31 so that the distance $d_c$ can be selectively fixed at any desired point.

As soon as the cam follower members 31 and 32 are locked together to fix distance $d_c$, it will be seen that since the axial reference planes $AP_{OD}$ and $AP_{FL}$ are located on the lens body $B_L$ an effectively fixed axial distance $d_3$ apart, the equation $$d_c = d_3 - d_a + d_b = \text{constant}$$

is satisfied. It follows that the equation can be rewritten as $$d_3 - K \log_x \frac{\text{actual object distance}}{\text{smallest object distance}} + K \log_x \frac{\text{actual focal length}}{\text{smallest focal length}} = \text{constant}$$

which can be rewritten as $$K \log_x \frac{\text{smallest object distance}}{\text{smallest focal length}} -$$

$$K \log_x \frac{\text{actual object distance}}{\text{actual focal length}} = \text{constant} - d_3.$$

Since K, X, smallest object distance, smallest focal length, and $d_3$ are all constants, it follows that $\log_x$ actual object distance/actual focal length is also constant which implies that $$\frac{\text{actual object distance}}{\text{actual focal length}} = \text{constant}.$$

Thus, once the members 31 and 32 are locked together, the ratio of object distance to focal length is maintained constant. This gives the desired result of reducing the degrees of freedom in the control of lens $L_Z$ from two to one in that turning the object distance control member $CM_{OD}$ to keep the object in focus or turning the focal length control member $CM_{FL}$ to keep the image the same size will result in both keeping the object in focus while at the same time maintaining the same image size. When the clip 48 is removed, the lens $L_Z$ can be operated in conventional manner.

From the foregoing, it will be seen that this embodiment of the interlock mechanism 10 is purely mechanical. It is to be understood, however, that different mechanical arrangements of mechanism 10 may be used and that any number of different system operating values may be controlled. Likewise, the features of the invention may easily be incorporated in electrical or electromechanical embodiments. It will further be appreciated that the concepts of this embodiment may be applied to a movie camera or television camera.

ELECTRICAL EMBODIMENT

Figure 7:
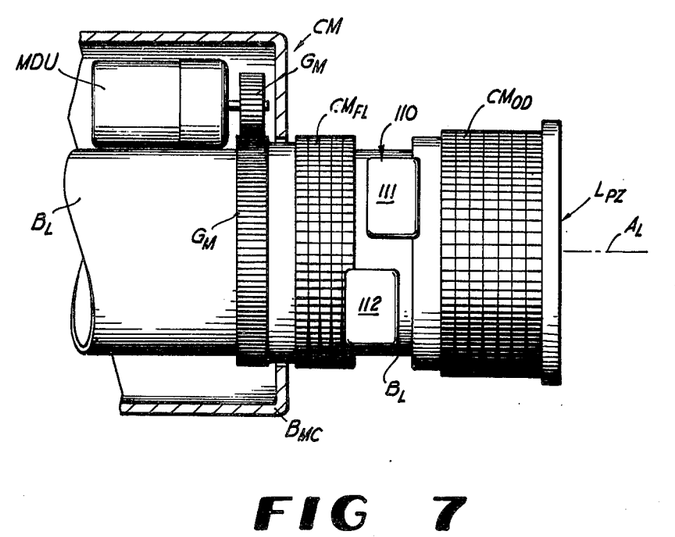
FIG. 7 is a side elevational view partially in cross-section of a second embodiment of the invention.
Figure 8:
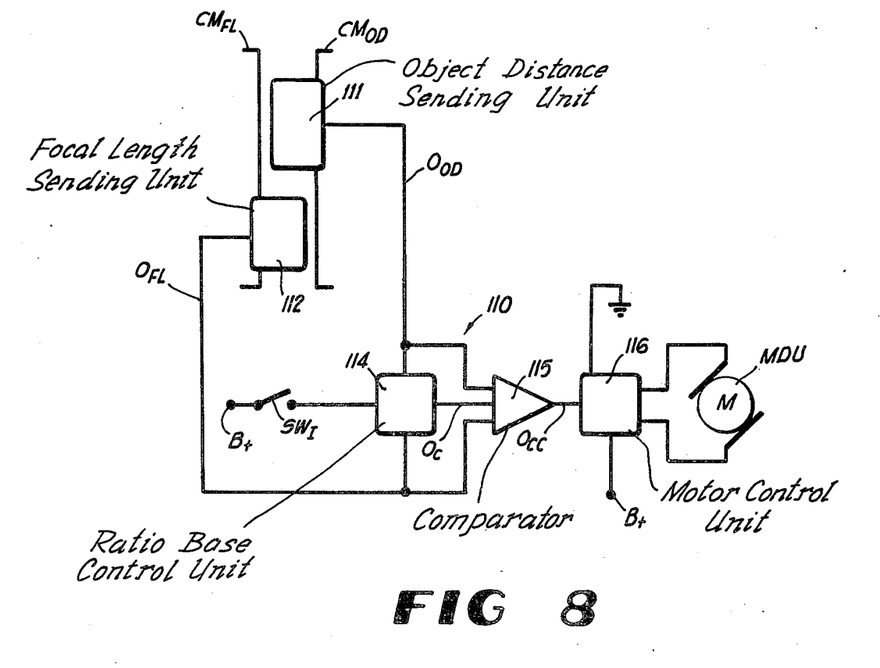
FIG. 8 is an electrical schematic for the control of that embodiment of the invention seen in FIG. 7.

FIGS. 7 and 8 schematically illustrate the inventive concept of the invention applied to a power zoom lens $L_{PZ}$ such as those normally used on a movie camera $C_M$ (partly seen in FIG. 7). The lens $L_{PZ}$ has an object distance control member $CM_{OD}$ and a focal length control member $CM_{FL}$ rotatably mounted on the lens body $B_L$ for rotation about the lens axis $A_L$ similarly to that of the lens $L_Z$ already described. The control member $CM_{OD}$ is usually manually controlled while control member $CM_{FL}$ is usually alternatively manually controlled or electrically powered by a reversible electric motor drive unit MDU through gears $G_M$ as seen in FIG. 7. The motor drive unit MDU and gears $G_M$ are usually housed in the camera body $B_{MC}$.

The invention is incorporated in an interlock control 110 which is operatively connected to both the control members $CM_{OD}$ and $CM_{FL}$ and the motor drive unit MDC. The interlock control 110 is seen schematically in FIG. 8, and includes an object distance sending unit 111 and a focal length sending unit 112. The respective outputs $O_{OD}$ and $O_{FL}$ of sending units 111 and 112 are connected to a ratio base control unit 114 and to a comparator 115. The output of the ratio base control unit 114 is also connected to the comparator 115 and the output of the comparator 115 is connected to a motor control unit 116. The output of the ratio base control unit 114 activates the compartor 115 and the ratio base control unit 114 produces an output in response to closure of an interlock switch $SW_I$ as will become more apparent.

The sending units 111 and 112 are constructed in such a way and operatively connected to the respective control members $CM_{OD}$ and $CM_{FL}$ so that their respective outputs $O_{OD}$ and $O_{FL}$ are the logarithmic values of the specific quantity in the object distance value range or the focal length value range to which lens $L_{PZ}$ is set. The output curve of the object distance sending unit 111 would approximate the curve seen in FIG. 5 if the lens $L_{PZ}$ is similar to lens $L_Z$ and the output curve of the focal length sending unit 112 would approximate the curve seen in FIG. 6 if lens $L_{PZ}$ is similar to lens $L_Z$. The sending units 111 and 112 may be biased diode networks, operational amplifier networks, Schmidt trigger networks, microprocessors or other types of networks understood in the art. It is further understood that the sending units 111 and 112 may be electromechanical in that the logarithmic values of the particular object distance and/or focal length quantities may be mechanically generated such as by using cams similar to cams 11 and 12 on lens $L_Z$ and cam follower members similar to members 31 and 32 on lens $L_Z$ and these mechanically generated logarithmic values used to generate an appropriate electrical output.

Rotation of control members $CM_{OD}$ and $CM_{FL}$ as seen in FIG. 7 generates the appropriate logarithmic outputs $O_{OD}$ and $O_{FL}$ from the sending units 111 and 112 to both the ratio base control unit 114 and comparator 115. The comparator 115 is, however, inoperative until the switch $SW_I$ is closed. Upon closure of switch $SW_I$, the difference of the outputs $O_{OD}$ and $O_{FL}$ at the ratio base control unit 114 is fixed by unit 114 and unit 114 generates a constant control output $O_C$ to the comparator 115 as long as switch $SW_I$ is closed which is representative of the difference of sending unit outputs $O_{OD}$ and $O_{FL}$ at the time of closure of switch $SW_I$. The control output $O_C$ renders the comparator 115 operative while at the same time appropriately biases the comparator 115 in such a manner that the comparator 115 generates a compared control output $O_{CC}$ to the motor control unit 116 until the difference between outputs $O_{OD}$ and $O_{FL}$ matches that indicated by the ratio base control unit 114. It is assumed that, on a camera with manual focus, the camera operator will appropriately operate the object distance control member $CM_{OD}$ to initially place the image in focus and the focal length control member $CM_{FL}$ to initially set the desired image size. On cameras which have the more recently developed capability of automatically focusing itself, more commonly known as autofocus, it will not be necessary to manually control the focus by varying object distance. Upon activation of switch $SW_I$, the operator can then manually operate the object distance control member $CM_{OD}$ or the autofocus can change the object distance setting to keep the image in focus if the camera/object distance changes and the interlock control 110 will appropriately drive the motor drive unit MDU to cause the focal length control member $CM_{FL}$ to track the control member $CM_{OD}$ to keep the image size the same. It is further to be understood that the object distance control member $CM_{OD}$ may be motor driven. It will also be appreciated that the concepts of this embodiment may be applied to a still camera or television camera.

OTHER EMBODIMENTS

While the embodiments of the invention illustrated hereinbefore are incorporated in a system having only two degrees of freedom, it is to be understood that it can be applied to any system having any number of degrees of freedom. In any such system, each of those control values which are sought to be controlled in accordance with the invention would have sending means for generating an output which is logarithmic of the particular quantities over the operating value range and interlock means for selectively interconnecting the control elements controlling the various control values so that selected fixed ratios can be maintained between the logarithmic outputs of the sending means and thus the various operating values. It is also not necessary that the degrees of freedom need be reduced to one but can be reduced to any desired number less than the total number of degrees of freedom available in the syste including zero degrees of freedom such as, for example, an autofocus camera.

Figures 9, 10:
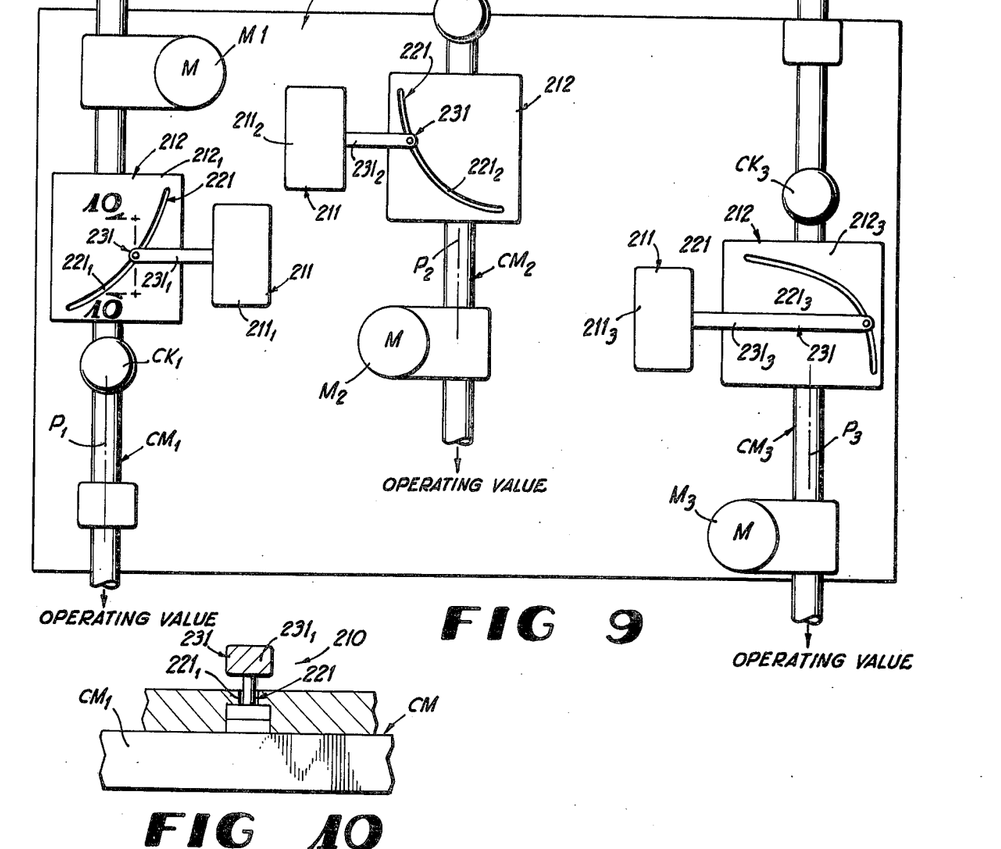
FIG. 9 is a plan view of a third embodiment of the invention.
FIG. 10 is a cross-sectional view taken generally along line 10—10 in FIG. 9.
Figure 11:
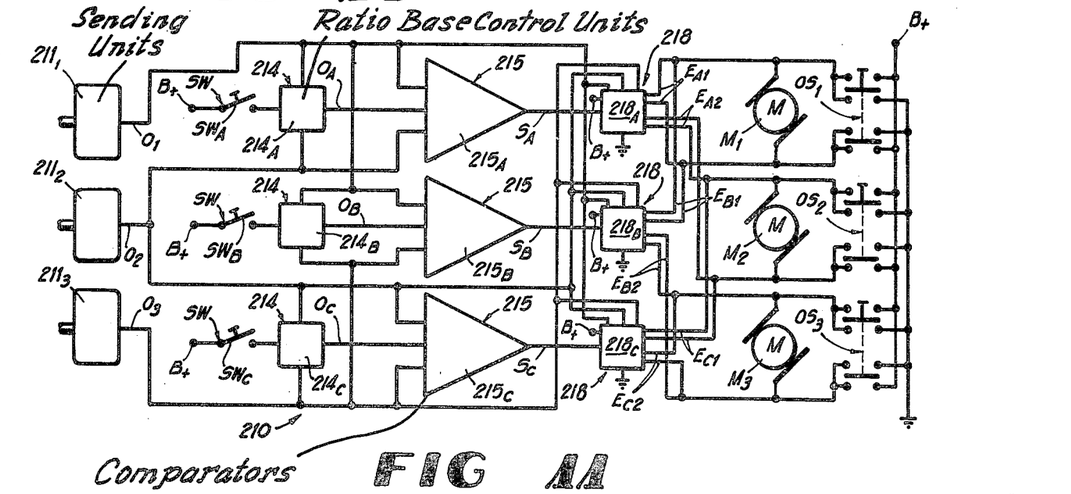
FIG. 11 is an electrical schematic for the invention of FIGS. 9 and 10.

FIGS. 9-11 illustrates a system which has three independently variable operating values and thus three degrees of freedom. While not intending to be limited the system $S_3$ in FIGS. 9-11 has its three values controlled by three different control members $CM_1$-$CM_3$ where each can be manually adjusted with control knobs $CK_1$-$CK_3$ and/or electrically adjusted with motors $M_1$-$M_3$. The control members $CM_1$-$CM_3$ are illustrated as axially movable along respective paths $P_1$-$P_3$.

The interlock mechanism 210 has a separate sending unit 211 connected to each control member $CM_1$-$CM_3$ and are respectively referenced $211_1$-$211_3$. The sending units 211 may be mechanical or electrical but are illustrated as electromechanical by way of example. Each sending unit 211 has associated therewith a cam member 212 which is moved by the associated control member CM. Each cam member 212 has a cam slot 221 therein which displaces a cam follower member 231 a distance corresponding to the logarithm of the quantity in the operating value range set by the control member CM as described for cam 11 and cam follower member 31 in the interlock mechanism 10. To distinguish between the different cam members, cam slots and cam follower members, they have been respectively referenced $212_1$-$212_3$, $221_1$-$221_3$ and $231_1$-$231_3$ to correspond to their sending units $211_1$-$211_3$. The displacement of the cam follower members $231_1$-$231_3$ serves to control the outputs $O_1$-$O_3$ of sending units $211_1$-$211_3$ so that they correspond to the logarithmic quantities of the operating values associated therewith. Thus, from FIG. 11, it will be seen that the position of control member $CM_1$ generates logarithmic output $O_1$, the position of control member $CM_2$ generates logarithmic output $O_2$, and the position of control member $CM_3$ generates logarithmic output $O_3$.

The output $O_1$ is connected to ratio base control units $214_A$ and $214_B$; to comparators $215_A$ and $215_B$; and to selector switch $218_A$, $218_B$ and $218_C$. Output $O_2$ is connected to ratio base control units $214_A$ and $215_C$; to comparators $215_A$ and $215_C$; and to selector switches $218_A$, $218_B$ and $218_C$. Output $O_3$ is connected to ratio base control units $214_B$ and $214_C$; to comparators $215_B$ and $215_C$; and to selector switches as $218_A$, $218_B$ and $218_C$. Each of the ratio base control units 214 is controlled by an actuating switch SW which have been individually labelled $SW_A$-$SW_C$. Switches $SW_A$-$SW_C$ may be ganged to operated together. Closure of switches $SW_A$-$SW_C$ activates the interlock mechanism 210. Closure of switch $SW_A$ causes the ratio base control unit $214_A$ to generate a constant output $O_A$ to the comparator $215_A$ has long as switch $SW_A$ remains closed which is representative of the difference between outputs $O_1$ and $O_2$ at the time of closure of switch $SW_A$. Closure of switch $SW_B$ causes the ratio base control unit $214_B$ to generate a constant output $O_B$ to the compartor $215_B$ as long as switch $SW_B$ remains closed which is representative of the difference between outputs $O_1$ and $O_3$ at the time of closure of switch $SW_B$. Closure of switch $SW_C$ causes the ratio base control unit $214_C$ to generate a constant output $O_C$ to the comparator $215_C$ as long as switch $SW_C$ remains closed which is representative of the difference between outputs $O_2$ and $O_3$ at the time of closure of switch $SW_C$.

The control output $O_A$ renders comparator $215_A$ operative while at the same time appropriately biases the comparator $215_A$ in such a manner that the comparator generates a compared control output signal $S_A$ to selector switch $218_A$ until the difference between outputs $O_1$ and $O_2$ matches that indicated by the ratio base control unit $214_A$. The control output $O_B$ renders comparator $215_B$ operative while at the same time appropriately biases the comparator $215_B$ in such a manner that the comparator generates a compared control output signal $S_B$ to selector switch $218_B$ until the difference between outputs $O_1$ and $O_3$ matches that indicated by the ratio base control unit $214_B$. The control output $O_C$ renders comparator $215_C$ operative while at the same time appropriately biases the comparator $215_C$ in such a manner that the comparator generates a compared control output signal $S_C$ to selector switch $218_C$ until the difference between outputs $O_2$ and $O_3$ matches that indicated by the ratio base control unit $214_C$.

The selector switches 218 can alternatively generate one of two output signals or no output signal when activated by the compared control output signal S from the comparator 215 connected thereto. Selector switch $218_A$ can generate an energizing signal $E_{A1}$ to $M_1$ or signal $E_{A2}$ to motor $M_2$, selector switch $218_B$ can generate an energizing signal $E_{B1}$ to motor $M_1$ or signal $E_{B2}$ to motor $M_3$, and selector switch $218_C$ can generate an energizing signal $E_{C1}$ to motor $M_2$ or signal $E_{C2}$ to motor $M_3$. It will be noted that all of the outputs $O_1$-$O_3$ are connected to each selector switch 218. Each motor $M_1$-$M_3$ may also be individually controlled through a respective operator actuated switch $OS_1$-$OS_3$ as will become more apparent.

To activate the complete interlock mechanism 210, the operator sets the operating values to the desired ratios using control knobs $CM_1$-$CM_3$ and/or switches $OS_1$-$OS_3$ with motors $M_1$-$M_3$. The operator then closes the activation switches $SW_A$-$SW_C$ energize ratio base control units $214_A$-$214_C$ and activate the interlock mechanism 210. Now if the setting on one of the control members CM is changed, the mechanism 210 will appropriately move the other control members CM to maintain the set ratio between the operating values. For example, assume control member $CM_1$ is moved to change the operating value controlled thereby. This changes output $O_1$. When output $O_1$ changes, this change causes selector switch $218_C$ to remain disabled, causes selector switch $218_A$ to select output $E_{A2}$ to motor $M_2$, and causes selector switch $218_B$ to select output $E_{B2}$ to motor $M_3$. The change in output $O_1$ causes the comparator $215_A$ to sense a differential between outputs $O_1$ and $O_2$ different from that initially set in ratio base control unit $214_A$ and generate an appropriate compared control output $S_A$ to selector switch $218_A$. This causes switch $218_A$ to appropriately energize the motor $M_2$ through outputs $E_{A2}$ to move the control member $CM_2$ until the differential sensed by comparator $215_A$ again matches that initially set in ratio base control unit $214_A$. At the same time, the change in output $O_1$ causes the comparator $215_B$ to sense a differential between outputs $O_1$ and $O_3$ different from that initially set in ratio base control unit $214_B$ and generate an appropriate compared control output $S_B$ to selector switch $218_B$. This causes switch $218_B$ to appropriately energize the motor $M_3$ through outputs $E_{B2}$ to move the control member $CM_3$ until the differential sensed by comparator $215_B$ again matches that initially set in ratio base control unit $214_B$. Thus it will be seen that the control member $CM_2$ and $CM_3$ have been moved until the operating values controlled thereby have the same ratio as they had initially. It also should be noted that the changes in outputs $O_2$ and $O_3$ will cause the comparator $215_C$ to sense a differential between outputs $O_2$ and $O_3$ different from that initially set in ratio base control unit $214_C$ and generate an appropriate compared control output $S_C$ to selector switch $218_C$. Because switch $218_C$ remains disabled as explained above, this signal has no effect on motors $M_2$ and $M_3$. Once the adjusting operation is complete, the switches $218_A$-$218_C$ return to their initial state and the interlock mechanism 210 is reset.

From the foregoing, it will be seen that the first changed output $O_1$-$O_3$ appropriately enables the selector switches $218_A$-$218_C$ to cause the other motors $M_1$-$M_3$ not associated with the initially changed output $O_1$-$O_3$ to be controlled from the comparators $215_A$-$215_C$ which compare the first changed output $O_1$-$O_3$ with each of the other outputs $O_1$-$O_3$ where the comparator $215_A$-$215_C$ comparing the outputs $O_1$-$O_3$ not initially changed is rendered ineffective. For instance, if output $O_2$ is the first changed, then outputs $E_{A1}$ from switch $218_A$ would be selected, outputs $E_{C2}$ from switch $218_C$ would be selected, and switch $218_B$ would be disabled. On the other hand, if output $O_3$ is the first changed, then outputs $E_{B1}$ from switch $218_B$ would be selected, outputs $E_{C1}$ from switch $218_C$ would be selected, and switch $218_A$ would be disabled. The adjustment would be made in these conditions similarly to that described above.

It will also be appreciated that the mechanism 210 may be used to interlock any two of the control members CM as well as all three as explained above. For instance, control members $CM_1$ and $CM_2$ may be interlocked by closing activation switch $SW_A$ and leaving switches $SW_B$ and $SW_C$ open. Control members $CM_2$ and $CM_3$ may be interlocked by closing switch $SW_C$ and leaving switches $SW_A$ and $SW_B$ open. Control members $CM_1$ and $CM_3$ may be interlocked by closing switch $SW_B$ and leaving switches $SW_A$ and $SW_C$ open.

It will be noted that the interlocking process need not be a one step procedure, but may be performed in separate steps. For example, a system with eight independent operating values $V_1$-$V_8$ would have eight degrees of freedom. One may interlock values $V_2$, $V_5$, and $V_7$; interlock values $V_1$, $V_3$, and $V_8$; and interlock values $V_4$ and $V_6$ in accordance with the invention. The system would then have three degrees of freedom with the ratio $V_2/V_5$, $V_2/V_7$ or $V_5/V_7$ being constant. Likewise the ratio $V_1/V_3$, $V_1/V_6$ or $V_3/V_6$ would be constant and the ratio $V_4/V_6$ would be constant. The ratio of the values in any one interlocked group to the ratio of the values in any other interlocked group may be independently changed as desired. At some later time, any of the three interlocked groups of values may be interlocked with any other interlocked group of values in accordance with the invention to reduce the system degrees of freedom to two or all of the interlocked groups of values may be interlocked in accordance with the invention to reduce the system degrees of freedom to one.

I claim:

1. A method of maintaining selected desired ratios between a plurality of system operating control values where each of the system operating control values is independently controlled over different quantity ranges by separate control members and where equal movements of the separate control members may produce different changes in the operating control values controlled thereby; said method comprising the steps of:
    (a) connecting a separate output member to each of the control members so that each of the output members is displaced relative to a common reference point as the control member is moved to change the actual quantity of the operating control value controlled thereby where the position of each of said output members relative to the common reference point corresponds to the logarithm to a common base of the actual quantity of the operating control value set by the associated control member; and so that displacement of said output member relative to the common reference point causes the control member associated therewith to move to change the quantity of the operating control value controlled thereby in order that the actual quantity of the control value is the antilogarithm of the position of the output member relative to the common reference point; and
    (b) selectively interconnecting at least two of the output members to maintain the relative positions between said interconnected output members fixed as long as said output members remain interconnected so that movement of one of the control members causes simultaneous like displacement of all of said interconnected output members to maintain the same difference in logarithmic values indicated by said output members relative to the common reference point as that when said interconnected output members are interconnected and so that the other control members connected to said interconnected output members are moved to maintain the ratios of the actual quantities of the interconnected control values constant.

2. The method of claim 1 wherein the system is a zoom lens, wherein one of the system operating control values is object distance, and wherein another of the system operating control values is focal length.

3. A method of maintaining selected desired ratios between a plurality of system operating control values where each of the system operating control values is independently controlled over different quantity ranges comprising the steps of:
    (a) generating a separate voltage output for each of the system operating control values, each of which is representative of the logarithmic value to a common base of the system operating control value with which said voltage output is associated;
    (b) comparing any selected two of said separate voltage outputs to determine the voltage difference therebetween;
    (c) selecting a desired voltage difference to be maintained between the selected two of said separate voltage outputs; and
    (d) as one of said selected separate voltage outputs changes by a change in the quantity of the system operating control value associated therewith, changing the system operating control value associated with the other of said selected separate voltage outputs to maintain the compared voltage difference between the selected two of said separate voltage outputs equal to the selected desired voltage difference to be maintained so that the ratio of the actual quantities of the system operating control values associated with the selected two of said separate control members is maintained constant.

4. The method of claim 3 wherein the system is a zoom lens, wherein one of the system operating control values is object distance, and wherein another of the system operating control values is focal length.

5. The method of claim 1 wherein step (a) further comprises connecting the output members to the control members so that the output members are displaced along substantially parallel linear paths.

6. In a system having a plurality of independent operating control values where each of the operating control values is changeable over a prescribed quantity range by a separate control input and where the control inputs are independently operable to independently change each of the operating control values, the improvement comprising interconnecting means for maintaining selected prescribed ratios between selected system operating control values as one of the selected system operating control values is changed; said interconnecting means including:

a plurality of sending means, one of said sending means operatively associated with each of the selected system operating control values, each of said sending means generating a control output whose value is the logarithm to a common base of the quantity of the system operating control value operatively associated with said sending means;

drive means for selectively changing those control inputs controlling the selected operating control values between which the selected prescribed ratios are to be maintained as the one of the system operating control values is changed;

control means operatively connected to said plurality of sending means and said drive means, said control means responsive to a change in the control output of said sending means caused by a change in the quantity of the one of the selected system operating control values associated with the sending means to cause said drive means to change the control inputs of the other of the selected system operating control values to maintain selected prescribed differences the control outputs of said sending means associated with the other of the selected system operating values and the control output associated with the one of the selected system operating values initially changed so as to maintain selected prescribed ratios between the selected system operating values.

7. Apparatus for selectively maintaining prescribed ratios between first and second system operating control values where each system operating control value is normally independently controlled over different quantity ranges by separate control mechanisms comprising:

first sending means operatively associated with the first system operating control value for generating a first electrical output which is the logarithmic value to a common base of the set quantity of the first system operating control value;

second sending means operatively associated with the second system operating control value for generating a second electrical output which is the logarithmic value to the same common base of the set quantity of the second system operating control value, said first and second electrical outputs having like functional correspondences with the set quantity of the system operating control value associated therewith;

drive means for selectively adjusting the second system operating control value; and control means for controlling said drive means, for comparing said first and second electrical outputs, and for controlling said drive means so as to maintain a selected prescribed difference between said first and second electrical outputs whereby said control means causes said drive means to change the set quantity of the second system operating value as the set quantity of the first system operating value is changed so as to maintain the selected prescribed difference between said first and second electrical outputs and the selected prescribed ratio between the set quantities of the first and second system operating values.

8. The apparatus of claim 7 wherein said first and second electrical outputs are electrical voltages.

9. The apparatus of claim 8 wherein each of the separate control mechanisms includes a control member which changes the set quantity of the system operating control value in response to displacement of the control member relative to a reference point with the control members of the different control mechanisms being independently displaceable with respect to each other; and wherein each of said sending means includes a cam member carried by the movable with the control member of the control mechanism operatively associated with said sending means; and an input member operatively connected to said cam member so that movement of said cam member causes displacement of said input member with respect to said sending means where the displacement of said input member with respect to said sending means is the logarithm to a common base of the quantity in the operating control value range set by the control member, the electrical voltage output from said sending means being directly proportional to the displacement of said input member.

10. The apparatus of claim 9 wherein said control means includes comparator means for comparing said first and second electrical voltage outputs and for controlling said drive means so that the difference between said electrical voltage outputs is maintained at said selected prescribed difference, said control means further including ratio base control means operatively connected to said comparator means for selectively fixing said selected prescribed difference maintained between said first and second electrical voltage outputs by said comparator means.

* * * * *